(12) United States Patent
Liu et al.

(10) Patent No.: US 12,732,850 B2
(45) Date of Patent: Sep. 8, 2026

(54) MEASUREMENT REPORT PROCESSING METHOD AND APPARATUS, AND COMMUNICATION DEVICE AND STORAGE MEDIUM

(71) Applicant: GUANGDONG OPPO MOBILE TELECOMMUNICATIONS CORP., LTD., Dongguan (CN)

(72) Inventors: Yang Liu, Dongguan (CN); Jiangsheng Fan, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 291 days.

(21) Appl. No.: 18/526,490

(22) Filed: Dec. 1, 2023

(65) Prior Publication Data

US 2024/0098548 A1 Mar. 21, 2024

Related U.S. Application Data

(63) Continuation of application No. PCT/CN2021/097949, filed on Jun. 2, 2021.

(51) Int. Cl.
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC .............................. H04W 24/10; H04W 24/08
See application file for complete search history.

(56) References Cited

U.S. PATENT DOCUMENTS

2020/0314732 A1* 10/2020 Park ...................... H04L 5/0055
2020/0359251 A1 11/2020 Gunnarsson et al.
2023/0045440 A1* 2/2023 Sharma ................ H04W 24/10
2023/0156510 A1* 5/2023 Li ........................ H04W 48/04
370/252

FOREIGN PATENT DOCUMENTS

CN 111918308 A 11/2020
WO 2021063790 A1 4/2021
WO 2022027167 A1 2/2022

OTHER PUBLICATIONS

Supplementary European Search Report issued in corresponding European Application No. 21943520.3, mailed on Jul. 4, 2024, 13 pages.

(Continued)

*Primary Examiner* — Vladimir Magloire
(74) *Attorney, Agent, or Firm* — BAYES PLLC

(57) ABSTRACT

Disclosed are a measurement information processing method and apparatus. The method includes: when the terminal enters a first cell, processing measurement information according to first indication information. The first cell is a Stand-alone Non-Public Networks (SNPN) cell or a Closed Access Group (CAG) cell, and a processing manner for processing the measurement information includes at least one of: whether to log the measurement information, and whether to report a logged measurement report.

9 Claims, 3 Drawing Sheets

(56) References Cited

OTHER PUBLICATIONS

"RAN2 impact on Non-Public Network Deployment using SNPN", Agenda Item: 11.13, Source: Intel Corporation, 3GPP TSG RAN WG2 Meeting #105, R2-1900760, Athens, Greece, Feb. 25-Mar. 1, 2019, 5 pages.
"Impact of SNPN on PLMN Check for MDT", Agenda Item: 6.10.1, Source: Nokia, Nokia Shanghai Bell, 3GPP TSG-RAN WG2 Meeting #111e, R2-2007512, R2-2005618, Online, Aug. 17-28, 2020.
3GPP TSG RAN WG2#113-bis-e Electronic meeting, Apr. 12-Apr. 20, 2021; R2-2104197 Source: ZTE Corporation, Sanechips; Title: On support MDT in NPN.
International Search Report issued in International application No. PCT/CN2021/097949, mailed Feb. 25, 2022.
Written Opinion of the International Searching Authority issued in International application No. PCT/CN2021/097949, mailed Feb. 25, 2022.
3GPP TS 38.304 V16.1.0 (Jul. 2020); Technical Specification Group Radio Access Network; NR; User Equipment (UE) procedures in Idle mode and RRC Inactive state (Release 16).
3GPP TS 38.331 V16.1.0 (Jul. 2020); Technical Specification Group Radio Access Network; NR; Radio Resource Control (RRC) protocol specification (Release 16).

* cited by examiner

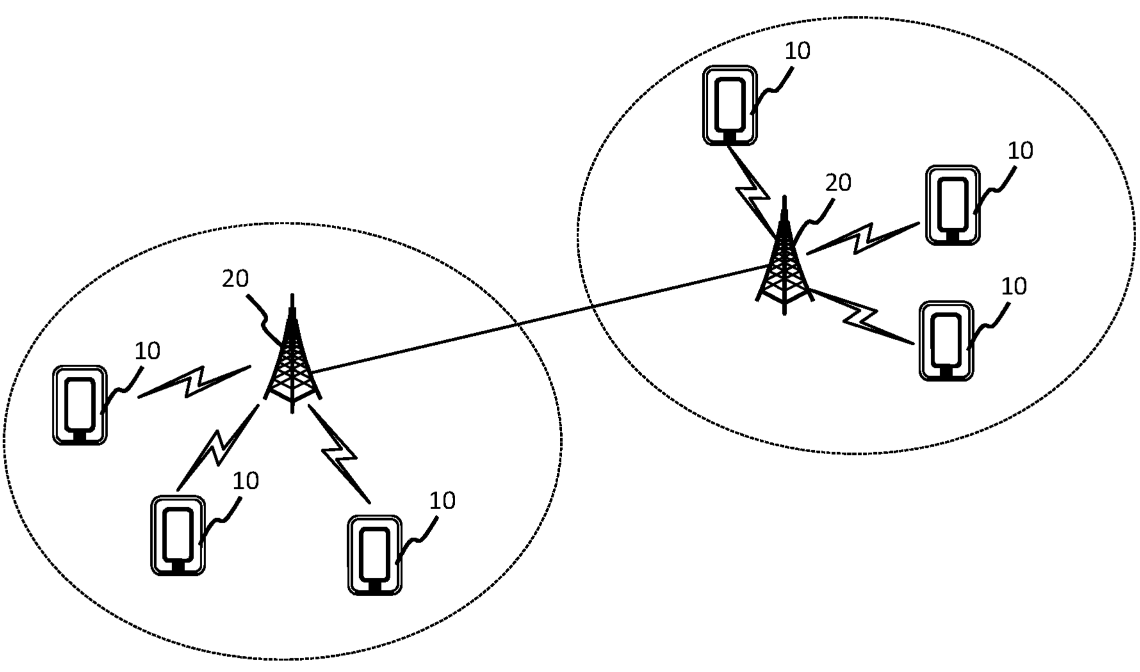

FIG. 1

When the terminal enters a first cell, process measurement information according to first indication information; wherein the first cell is a Stand-alone Non-Public Networks (SNPN) cell or a Closed Access Group (CAG) cell, and a processing manner includes at least one of: whether to log the measurement information, and whether to report a logged measurement report

Send first indication information to a terminal, wherein the first indication information is used to indicate the terminal to process measurement information when entering a first cell, the first cell is a Stand-alone Non-Public Networks (SNPN) cell or a Closed Access Group (CAG) cell, and a processing manner for processing the measurement information includes: whether to log the measurement information, and whether to report a logged measurement report.

MEASUREMENT REPORT PROCESSING METHOD AND APPARATUS, AND COMMUNICATION DEVICE AND STORAGE MEDIUM

CROSS-REFERENCE TO RELATED APPLICATION

This application is a continuation of International Application No. PCT/CN2021/097949, filed on Jun. 2, 2021, which is incorporated herein by reference in its entirety.

TECHNICAL FIELD

The present disclosure relates to the wireless communication technical field, and more specifically, to a measurement report processing method and apparatus, a communication device and a storage medium.

BACKGROUND

Minimization of Drive-Test (MDT) is a method for enabling a terminal to report its collected measurement value(s) related to network performance in a case where the terminal's permission is obtained.

In related art, when a network side configures a logged MDT for a terminal, the terminal logs a measurement report corresponding to a cell which the terminal enters when the terminal falls back to a Radio Resource Control (RRC) idle state, and reports a logged measurement report to the network side when the terminal returns to a RRC connected state.

SUMMARY

Embodiments of the present disclosure provide a measurement information processing method and apparatus, a communication device and a storage medium. The technical solutions are as follows:

According to an aspect, an embodiment of the present disclosure provides a measurement information processing method, the method is performed by a terminal, and the method includes:

when the terminal enters a first cell, processing measurement information according to first indication information;

wherein the first cell is a Stand-alone Non-Public Networks (SNPN) cell or a Closed Access Group (CAG) cell, and a processing manner for processing the measurement information includes at least one of: whether to log the measurement information, and whether to report a logged measurement report.

In a possible implementation, the method further includes:

receiving the first indication information sent by a network side device.

In a possible implementation, the first indication information includes a first tag, and the first tag is used to indicate at least one of: whether measurement information logging is performed for the SNPN cell and/or CAG cell, and whether reporting of a logged measurement report is performed for the SNPN cell and/or CAG cell.

In a possible implementation, the first indication information includes a first cell list, and the first cell list includes an identity of a cell for which measurement information logging is performed and reporting of a logged measurement report is performed.

In a possible implementation, the first indication information includes a second cell list and a third cell list;

wherein the second cell list includes an identity of a cell for which measurement information logging is performed; and wherein the third cell list includes an identity of a cell for which reporting of a logged measurement report is performed.

In a possible implementation, receiving the first indication information sent by the network side device includes:

receiving the first indication information sent by the network side device when the terminal is in a RRC connected state.

In a possible implementation, the network side device is a base station corresponding to the first cell, and the first indication information includes a second tag; and the second tag is used to indicate at least one of: whether the first cell supports measurement information logging by a connected terminal, and whether the first cell supports reporting of a logged measurement report by the connected terminal in the first cell.

In a possible implementation, receiving the first indication information sent by the network side device includes:

receiving the first indication information sent by the base station through system broadcast or dedicated signaling.

According to another aspect, an embodiment of the present disclosure provides a measurement information processing method, the method is performed by a network side device, and the method includes:

sending first indication information to a terminal, wherein the first indication information is used to indicate the terminal to process measurement information when entering a first cell, the first cell is a Stand-alone Non-Public Networks (SNPN) cell or a Closed Access Group (CAG) cell, and a processing manner for processing the measurement information includes: whether to log the measurement information, and whether to report a logged measurement report.

In a possible implementation, the first indication information includes a first tag, and the first tag is used to indicate at least one of: whether measurement information logging is performed for the SNPN cell and/or CAG cell, and whether reporting of a logged measurement report is performed for the SNPN cell and/or CAG cell.

In a possible implementation, the first indication information includes a first cell list, and the first cell list includes an identity of a cell for which measurement information logging is performed and reporting of a logged measurement report is performed.

In a possible implementation, the first indication information includes a second cell list and a third cell list;

the second cell list includes an identity of a cell for which measurement information logging is performed; and the third cell list includes an identity of a cell for which reporting of a logged measurement report is performed.

In a possible implementation, sending the first indication information to the terminal includes:

sending the first indication information to the terminal when the terminal is in a RRC connected state.

In a possible implementation, the network side device is a base station corresponding to the first cell, and the first indication information includes a second tag;

the second tag is used to indicate at least one of: whether the first cell supports measurement information logging by a connected terminal, and whether the first cell supports reporting of a logged measurement report by the connected terminal in the first cell.

In a possible implementation, sending the first indication information to the terminal includes:

sending the first indication information to the terminal through system broadcast or dedicated signaling.

According to another aspect, an embodiment of the present disclosure provides a measurement information processing apparatus, wherein apparatus is applied in a terminal, and the apparatus includes:

a processing module configured to, when the terminal enters a first cell, process measurement information according to first indication information;

wherein the first cell is a Stand-alone Non-Public Networks (SNPN) cell or a Closed Access Group (CAG) cell, and a processing manner for processing the measurement information includes at least one of: whether to log the measurement information, and whether to report a logged measurement report.

In a possible implementation, the apparatus further includes:

an indication information receiving module configured to receive the first indication information sent by a network side device.

In a possible implementation, the first indication information includes a first tag, and the first tag is used to indicate at least one of: whether measurement information logging is performed for the SNPN cell and/or CAG cell, and whether reporting of a logged measurement report is performed for the SNPN cell and/or CAG cell.

In a possible implementation, the first indication information includes a first cell list, and the first cell list includes an identity of a cell for which measurement information logging is performed and reporting of a logged measurement report is performed.

In a possible implementation, the first indication information includes a second cell list and a third cell list;

the second cell list includes an identity of a cell for which measurement information logging is performed; and the third cell list includes an identity of a cell for which reporting of a logged measurement report is performed.

In a possible implementation, the indication information receiving module is configured to:

receive the first indication information sent by the network side device when the terminal is in a RRC connected state.

In a possible implementation, the network side device is a base station corresponding to the first cell, and the first indication information includes a second tag; and the second tag is used to indicate at least one of: whether the first cell supports measurement information logging by a connected terminal, and whether the first cell supports reporting of a logged measurement report by the connected terminal in the first cell.

In a possible implementation, the indication information receiving module is configured to:

receive the first indication information sent by the base station through system broadcast or dedicated signaling.

According to another aspect, an embodiment of the present disclosure provides a measurement information processing apparatus, wherein the apparatus is applied in a network side device, and the apparatus includes:

an indication information sending module configured to send first indication information to a terminal, wherein the first indication information is used to indicate the terminal to process measurement information when entering a first cell, the first cell is a Stand-alone Non-Public Networks (SNPN) cell or a Closed Access Group (CAG) cell, and a processing manner for processing the measurement information includes: whether to log the measurement information, and whether to report a logged measurement report.

In a possible implementation, the first indication information includes a first tag, and the first tag is used to indicate at least one of: whether measurement information logging is performed for the SNPN cell and/or CAG cell, and whether reporting of a logged measurement report is performed for the SNPN cell and/or CAG cell.

In a possible implementation, the first indication information includes a first cell list, and the first cell list includes an identity of a cell for which measurement information logging is performed and reporting of a logged measurement report is performed.

In a possible implementation, the first indication information includes a second cell list and a third cell list;

the second cell list includes an identity of a cell for which measurement information logging is performed; and the third cell list includes an identity of a cell for which reporting of a logged measurement report is performed.

In a possible implementation, the indication information sending module is configured to:

send the first indication information to the terminal when the terminal is in a RRC connected state.

In a possible implementation, the network side device is a base station corresponding to the first cell, and the first indication information includes a second tag; and the second tag is used to indicate whether the first cell supports at least one of: measurement information logging by a connected terminal, and reporting of a logged measurement report by the connected terminal in the first cell.

In a possible implementation, the indication information sending module is configured to:

sending the first indication information to the terminal through system broadcast or dedicated signaling.

According to another aspect, an embodiment of the present disclosure provides a communication device. The communication device includes a processor, a memory, and a transceiver. The memory stores a computer program, and the computer program is configured to be executed by the processor to implement the measurement information processing methods described above.

According to another aspect, an embodiment of the present disclosure further provides a computer-readable storage medium, wherein a computer program is stored in the storage medium, and the computer program is loaded and executed by a processor to implement the measurement information processing methods described above.

According to another aspect, there is provided a computer program product. The computer program product includes computer instructions stored in a computer-readable storage medium. A processor of a communication device reads the computer instructions from the computer-readable storage medium and executes the computer instructions, to cause the computer device to carry out the measurement information processing methods described above.

According to another aspect, there is provided a chip. The chip is configured to run in a communication device, to cause the communication device to carry out the measurement information processing methods described above.

According to another aspect, there is provided a computer program, wherein the computer program is executed by a processor of a communication device, to implement the measurement information processing methods described above.

The technical solutions provided in the embodiments of the present disclosure can bring the following beneficial effects:

When a terminal enters a first cell belonging to a SNPN or CSG cell, the terminal can determine through indication information whether to log and/or report measurement information, so as to avoid unnecessary logging and/or reporting of the measurement information of the SNPN or CSG cell, achieve the effect of saving transmission resources, storage resources and terminal power, and improve the resource utilization efficiency when the terminal performs logging and/or reporting of the measurement information.

BRIEF DESCRIPTION OF THE DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without creative effort.

FIG. 1 is a schematic diagram of a network architecture of a communication system provided by an embodiment of the present disclosure;

FIG. 2 is a flowchart of a measurement information processing method provided by an embodiment of the present disclosure;

FIG. 3 is a flowchart of a measurement information processing method provided by an embodiment of the present disclosure;

DETAILED DESCRIPTION

Figure 4:
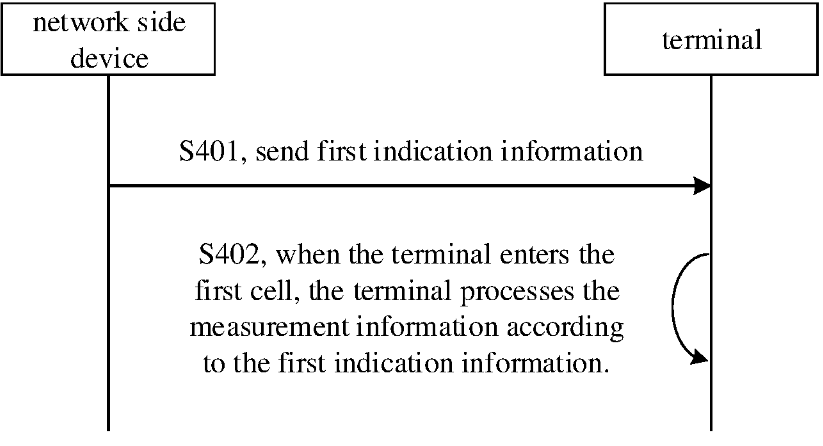
FIG. 4 is a flowchart of a measurement information processing method provided by an embodiment of the present disclosure.

In order to make the purposes, technical solutions and advantages of the present disclosure clearer, the implementations of the present disclosure will be further described in detail below in conjunction with the accompanying drawings.

The network architecture and service scenarios described in the embodiments of the present disclosure are for more clearly illustrating the technical solutions of the embodiments of the present disclosure, and do not constitute limitations on the technical solutions provided by the embodiments of the present disclosure. With the evolution of the technologies and the emergence of new service scenarios, the technical solutions provided in the embodiments of the present disclosure are also applicable to similar technical problems.

FIG. 1 shows a schematic diagram of a network architecture of a communication system provided by an embodiment of the present disclosure. The network architecture may include: at least one terminal 10 and at least one base station 20.

There are generally multiple terminals 10, and one or more terminals 10 may be distributed in a cell managed by each base station 20. The terminals 10 may include various handheld devices with wireless communication functions, vehicle-mounted devices, wearable devices, computing devices or other processing devices connected to a wireless modem, as well as various forms of User Equipment (UE), Mobile Station (MS), terminal device and so on. For convenience of description, in the embodiments of the present disclosure, the above-mentioned devices are collectively referred to as a terminal.

The at least one base station 20 is a device deployed in an access network to provide a wireless communication function for the terminals 10. The at least one base station 20 may include various forms of satellite base stations, macro base stations, micro base stations, relay stations, access points and so on. In systems using different radio access technologies, the names of a device with base station functions may be different, for example, in 5G New Radio (NR) system, it is called gNodeB or gNB. The name "base station" may change as communication technologies evolve. For the convenience of description, in the embodiments of the present disclosure, the above-mentioned devices that provide the wireless communication functions for the terminals 20 are collectively referred to as a base station.

Optionally, what is not shown in FIG. 1 is that the above network architecture also includes other network devices, such as, a Central Network Control (CNC), an Access and Mobility Management Function (AMF) device, a Session Management Function (SMF) or a User Plane Function (UPF) device, etc.

The "5G NR system" in the embodiments of the present disclosure may also be referred to as a 5G system or an NR system, but those skilled in the art can understand its meaning. The technical solutions described in the embodiments of the present disclosure can be applied to the 5G NR system, or can be applied to subsequent evolution system of the 5G NR system, or can be applied to a system before the 5G NR system, such as the Long Term Evolution (LTE) system.

The 5G NR system is a new generation of wireless communication system proposed based on user requirements for wireless communication speed, delay, high-speed mobility, and energy efficiency, as well as the diversity and complexity of wireless communication services in future life. In the 5G network environment, in order to reduce air interface signaling and quickly restore wireless connections and data services, a new Radio Resource Control (RRC) state is defined, that is, the RRC_INACTIVE state. This state is different from RRC idle state (RRC_IDLE) and RRC connected state (RRC_ACTIVE).

Traditionally, in order to better understand the performance of mobile networks, mobile network builders or network operators need to drive a car along a fixed line to collect a series of measurement values reflecting the current network performance, such as downlink signal quality/interference. Based on the collected measurement values related to network performance, a network optimization team may then adjust t deployment of mobile network devices, signal strength, and antenna angle settings to improve mobile network performance and user satisfaction. However, the disadvantage of this method is that with the expansion of the scale of the mobile network, drive testing will become more time-consuming and labor-intensive, which is not conducive to timely adjustment of network deployment by mobile operators, and requires a lot of cost.

Based on this, a signal collection method called Minimization of Drive-Test (MDT) is introduced in mobile networks. Its core idea is to enable many user terminals to report measured values collected by them in a case where terminals' permissions are obtained. On the premise that the number of terminals is sufficient, the network can quickly and economically obtain information related to network performance in the area. This method of collecting network performance from terminals in certain target areas is also called management-based MDT. In addition, MDT is also used to help the network collect network performance-related data of a specific terminal (for example, the terminal user often complains about poor network performance). This MDT collection method is called signaling-based MDT.

A MDT configuration file is sent to a terminal through a 5G core network control plane network element or an Operation Administration and Maintenance (OAM). After the terminal completes the collection and reporting to a base station, the base station sends the received report to an independent MDT data analysis network element (Trace Collection Entity, TCE).

Configuration signaling carrying the MDT configuration file is sent by the network side device to the terminal when the terminal is in the RRC connected state. If the network side device configures Logged MDT, when the terminal returns to the connected state, the terminal reports to the network side device a measured value which is logged when the terminal falls back to RRC_idle (idle state).

Current Logged MDT supports two measurement value logging trigger methods, namely periodic trigger and event trigger. If the trigger mode includes periodic trigger, the terminal logs measured radio measurement results at intervals. If the trigger mode includes event trigger, when a configured event condition is met, the terminal logs the measured radio measurement results. The terminal needs to log beam-related information when logging measurement results of a current serving cell and a neighboring cell by default.

5G NR R16 introduces Non-Public Networks (NPN). In order to increase the flexibility of NPN network deployment, NPN networks can be divided into Stand-alone Non-Public Networks (SNPN) and Closed Access Group (CAG) networks. The former identifies a SNPN network through a Public Land Mobile Network Identity (PLMN ID)+NID, and the latter identifies a CAG network through PLMN ID+CAG ID.

A public land mobile network may support any network sharing and combination mode of common public network, SNPN and CAG network at the same time. For example, a PLMN may support a common public network or a SNPN or a CAG network alone, or may support that a common public network and a SNPN share a PLMN network, or even a common public network, a SNPN and a CAG network share a PLMN network at the same time. A logical deployment relationship among a common public network, a SNPN and a CAG network may be shown in Table 1 below.

TABLE 1

| | | | |
|---|---|---|---|
| Network identity information broadcast by a cell | Public network PLMN ID list information | PLMN ID 1 | |
| | | PLMN ID 2 | |
| | | . . . | |
| | | PLMN ID N | |
| | Non-public network NPN network identity list information (optional) | PLMN ID N + 1 | CAG ID list 1 |
| | | PLMN ID N + 2 | CAG ID list 2 |
| | | . . . | . . . |
| | | PLMN ID N + M | CAG ID list M |
| | | PLMN ID N + M + 1 | NID list 1 |
| | | PLMN ID N + M + 2 | NID list 2 |
| | | . . . | . . . |
| | | PLMN ID N + M + W | NID list W |

As shown in Table 1, from the perspective of network configuration, a cell may configure both public network PLMN ID list information and non-public network NPN network identity list information. The non-public network NPN network identity list information is an optional parameter introduced by NR R16. For a CAG-type NPN network, a PLMN ID is allowed to be associated with a CAG ID list. For an SNPN-type NPN network, a PLMN ID is allowed to be associated with a NID list. The parameter N/M/W in Table 1 is a positive integer greater than or equal to 1.

In a solution shown in the present disclosure, a procedure of a terminal performing MDT measurement and reporting based on Logged MDT configuration may be as follows:

S1, detection is performed before logging.

Before the terminal logs measurement information in the RRC idle state, the terminal may first detect whether an identity of a registered PLMN (RPLMN) is in a PLMN ID list in the Logged MDT configuration. If the identity of the RPLMN is in the PLMN ID list in the Logged MDT configuration, the terminal logs measurement information of a cell in the PLMN, and obtains a logged measurement report.

S2, after receiving msg4 (random access message 4) from the network, the terminal chooses whether to send the logged MDT capability (availability) information to the network.

When the terminal restores to the RRC connected state, for example, when the 4-step random access is completed, the terminal detects whether the identity of the RPLMN is in the PLMN ID list in the Logged MDT configuration; and if the identity of the RPLMN is in the PLMN ID list in the Logged MDT configuration, the terminal sends the logged MDT availability information to the network.

S3, the terminal chooses whether to send the logged measurement report to the network after receiving UEInformationRequest signaling.

The terminal may detect whether the identity of the RPLMN is in the PLMN ID list in the Logged MDT configuration, and if the identity of the RPLMN is in the PLMN ID list in the Logged MDT configuration, the terminal sends the logged MDT availability information to the network.

In the above scheme, during the logging and reporting of the logged measurement report, the terminal only checks whether the PLMN of the connected network is a PLMN included in the PLMN list configured in the previous logged measurement configuration. However, if the terminal is connected to a CSG network or a SNPN cell, the terminal also performs operations such as logging measurement information, reporting logged measurement availability, and/or reporting logged measurement report. However, the cells corresponding to the SNPN and CSG networks may not necessarily be connected to a TCE of a public network, and the TCE of the public network may not need to obtain the logged measurement results of the cells corresponding to the SNPN or CSG network. Therefore, if the logging and reporting of the logged measurement report is performed according to the above scheme, it will inevitably cause waste of transmission resources, storage resources and power.

The solutions shown in following embodiments of the present disclosure propose a method for processing measurement information. A terminal may determine, through indication information, whether to log and/or report MDT measurement information of a currently entered SNPN or CSG cell, so as to avoid unnecessary logging and/or reporting of measurement information of SNPN or CSG cells, achieve the effect of saving transmission resources, storage resources and terminal power, and improve the resource utilization efficiency of logged MDT.

FIG. 2 shows a flowchart of a measurement information processing method provided by an embodiment of the present disclosure. The method may be performed by a terminal. The terminal may be a terminal in the network architecture shown in FIG. 1. The method may include the following step:

In step 201, when the terminal enters a first cell, the terminal processes measurement information according to first instruction information. The first cell is a Stand-alone Non-Public Networks (SNPN) cell or a Closed Access Group (CAG) cell. The processing manner for processing the measurement information includes at least one of: whether to log the measurement information, and whether to report a logged measurement reports.

In a possible implementation, the terminal may process the measurement information according to a processing manner indicated by the first indication information.

The SNPN cell may refer to a cell in a SNPN network, and the CAG cell may refer to a cell in a CAG network.

In the embodiment of the present disclosure, the terminal may obtain in advance the first indication information used to indicate the logging and/or reporting behavior of the measurement information of the SNPN cell and/or the CAG cell. When the terminal needs to perform processing of logging and/or reporting of the measurement information, the terminal may determine the processing manner for the measurement information according to the first indication information, and based on the determined processing manner, the terminal processes the measurement information, for example, logging or not logging the measurement information, and reporting or not reporting a logged measurement report.

The logged measurement report may be obtained by the terminal by logging the measurement information.

In a possible implementation, the measurement information may be MDT measurement information measured by the terminal in the RRC idle state.

To sum up, in the solutions shown in the embodiments of the present disclosure, when the terminal enters a first cell belonging to the SNPN or CSG cell, the terminal can determine through the indication information whether to log and/or report the measurement information, so as to avoid unnecessary logging and/or reporting of the measurement information of SNPN or CSG cell, achieve the effect of saving transmission resources, storage resources and terminal power, and improve the resource utilization efficiency when the terminal performs logging and/or reporting of measurement information.

The first indication information involved in the solution shown in FIG. 2 may be indicated by the network side device.

FIG. 3 shows a flowchart of a measurement information processing method provided by an embodiment of the present disclosure. The method may be performed by a network side device. The network side device may be a base station in the network architecture shown in FIG. 1, or may be a network device other than terminals and base stations in the network architecture shown in FIG. 1. The method may include the following step:

In step 301, first indication information is sent to a terminal. The first indication information is used to indicate the terminal to process measurement information when entering a first cell. The first cell is a Stand-alone Non-Public Networks (SNPN) cell or a Closed Access Group (CAG) cell. The processing manner for processing the measurement information includes: whether to log the measurement information, and whether to report a logged measurement report.

The first indication information may be indication information effective for the first cell, or may be indication information effective for all or part of SNPN cell and/or CAG cell.

To sum up, in the solutions shown in the embodiments of the present disclosure, the network side device can configure indication information to the terminal. When the terminal enters the first cell belonging to the SNPN or CSG cell, the terminal can use the indication information to determine whether to perform processing of logging and/or reporting of the measurement information, so as to avoid unnecessary logging and/or reporting of the measurement information of the SNPN or CSG cell, achieve the effect of saving transmission resources, storage resources and terminal power, and improve the resource utilization efficiency when the terminal performs logging and/or reporting of the measurement information.

FIG. 4 shows a flowchart of a measurement information processing method provided by an embodiment of the present disclosure. The method may be performed interactively by a terminal and a network side device. The terminal may be a terminal in the network architecture shown in FIG. 1, and the network side device may be a base station in the network architecture shown in FIG. The network side device may also be other network device except terminals and base stations in the network architecture shown in FIG. 1. The method may include the step as follows:

In step 401, the network side device sends the first indication information to the terminal, and the terminal receives the first indication information.

In a possible implementation, the network side device may send the first indication information to the terminal when the terminal is in the RRC connected state. For example, the network side device sends a logged measurement configuration (LoggedMeasurementConfiguration) including the first indication information to the terminal.

Correspondingly, the terminal receives the first indication information sent by the network side device when the terminal is in the RRC connected state. For example, the terminal receives the above LoggedMeasurementConfiguration.

That is to say, in the solutions shown in the embodiments of the present disclosure, the network side device can reuse the existing LoggedMeasurementConfiguration to configure the first indication information to the terminal.

In a possible implementation, the first indication information includes a first tag; the first tag is used to indicate at least one of: whether to log measurement information for the SNPN and/or CAG cell, and whether to report a logged measurement report for the SNPN and/or CAG cell.

For example, the network side device may add the following optional information (namely the first tag) to the LoggedMeasurementConfiguration configured for the terminal to indicate a unified processing manner of the terminal for the measurement information of the SNPN and/or CAG cells.

| | |
|---|---|
| OPTIONAL (optional) | |
| snpn/csg needed | ENUMERATED{TRUE, FALSE} |
| or | |
| snpn/csg_recording | ENUMERATED{TRUE, FALSE} |
| snpn/csg_reporting | ENUMERATED{TRUE, FALSE} |

When the snpn/csg needed information corresponds to TRUE, it can indicate that the terminal needs to log the measurement information when entering the SNPN and/or CAG cell, and report the logged measurement report which is obtained by logging to the network side device when the terminal returns to the RRC connected state.

Correspondingly, when the snpn/csg needed information corresponds to FALSE, it can indicate that the terminal does not need to log the measurement information when entering the SNPN and/or CAG cell, and the terminal does not need to report the logged measurement report which is obtained by logging to the network side device when the terminal returns to the RRC connected state.

That is to say, in the embodiments of the present disclosure, the network side device can, through a single tag, simultaneously indicate whether the terminal logs the measurement information of the SNPN and/or CAG cell and indicate whether the terminal reports the logged measurement report which is obtained by logging to the network side device.

When the above snpn/csg_recording information corresponds to TRUE, it can indicate that the terminal needs to log the measurement information when entering the SNPN and/or CAG cell; correspondingly, when the snpn/csg_recording information corresponds to FALSE, it can indicate that the terminal does not need to log the measurement information when entering the SNPN and/or CAG cell.

When the above snpn/csg_reporting information corresponds to TRUE, it can indicate that the terminal needs to report the logged measurement report which is obtained by logging to the network side device when the terminal returns to the RRC connected state; correspondingly, when the snpn/csg_reporting information corresponds to FALSE, it may indicate that the terminal does not need to report the logged measurement report which is obtained by logging to the network side device when the terminal returns to the RRC connected state.

That is to say, in the embodiments of the present disclosure, the network side device can indicate, through a tag, whether the terminal logs the measurement information of the SNPN and/or CAG cell, and indicate, through another tag, whether the terminal reports the logged measurement report which is obtained by logging to the network side device.

In a possible implementation, the first indication information includes a first cell list, and the first cell list includes an identity of a cell for which measurement information logging is performed and reporting of a logged measurement report is performed.

In an embodiment of the present disclosure, the network side device may distinguish the processing manners for the measurement information of different SNPN and/or CAG cells. That is, for multiple SNPN and/or CAG cells, the network side device may respectively indicate to adopt different processing manners to process the measurement signal.

The network side device may configure a cell list to the terminal in the RRC connected state through LoggedMeasurementConfiguration. The cell list includes several SNPN and/or CAG cell identities to indicate that measurement information of cells corresponding to these identities needs to be logged and reported.

Alternatively, the network side device may also configure a cell list to the terminal in the RRC connected state through LoggedMeasurementConfiguration. The cell list includes several SNPN and/or CAG cell identities to indicate that measurement information of cells corresponding to these identities does not need to be logged and reported.

In a possible implementation, the first indication information includes a second cell list and a third cell list;

the second cell list includes an identity of a cell for which measurement information logging is performed;

the third cell list includes an identity of a cell for which reporting of a logged measurement report is performed.

Generally speaking, an identity of a cell in the third cell list also exists in the second cell list; however, an identity of a cell in the second cell list does not necessarily exist in the third cell list. That is to say, the second cell list includes an identity of a cell in the third cell list.

In an embodiment of the present disclosure, the network side device distinguishes the processing manners of the measurement information of different SNPN and/or CAG cells, and for multiple SNPN and/or CAG cells, the network side device may respectively indicate whether the measurement information logging is performed, and respectively indicate whether reporting of a logged measurement report is performed.

For example, the network side device may configure two cell lists for the terminal in the RRC connected state through LoggedMeasurementConfiguration. One of the two cell lists contains several SNPN and/or CAG cell identities, which are used to indicate that the terminal needs to log measurement information when the terminal enters cells corresponding to these identities. Another one of the two cell list also includes several SNPN and/or CAG cell identities, which are used to indicate that reporting of a logged measurement report needs to be performed for cells corresponding to these identities.

Alternatively, the network side device may configure two cell lists to the terminal in the RRC connected state through LoggedMeasurementConfiguration. One of the two cell lists contains several SNPN and/or CAG cell identities, which are used to indicate that the terminal does not need to log measurement information when the terminal enters cells corresponding to these identities. Another one of the two cell list also includes several SNPN and/or CAG cell identities, which are to indicate that reporting of a logged measurement report does not need to be performed for cells corresponding to these identities.

In a possible implementation, the network side device is a base station corresponding to the first cell; the first indication information includes a second tag;

the second tag is used to indicate at least one of: whether the first cell supports measurement information logging by a connected terminal, and whether the first cell supports reporting of a logged measurement report by the connected terminal in the first cell.

The first cell is a Stand-alone Non-Public Networks (SNPN) cell or a Closed Access Group (CAG) cell.

Whether the first cell supports measurement information logging refers to whether the first cell supports measurement information logging by a terminal entering the cell.

Correspondingly, whether the first cell supports reporting of a logged measurement report refers to whether the first cell supports reporting of the logged measurement report by the terminal.

The first indication information may be set for one cell (i.e., the first cell), that is, the first indication information is effective only for the first cell.

For example, the second tag may be a single tag, which is used to indicate whether the first cell supports logging and reporting. For example, when the second tag is TRUE, it means that the first cell supports a connected terminal to log measurement information, and the first cell supports the connected terminal to report a logged measurement report in the first cell. Correspondingly, when the second tag is FALSE, it means that the first cell does not support a connected terminal to log measurement information, and the first cell does not support the connected terminal to report a logged measurement report in the first cell.

In a possible implementation, when the network side device is a base station corresponding to the first cell, the network side device may send the first indication information to the terminal through system broadcast or dedicated signaling.

Correspondingly, the terminal receives the first indication information sent by the network side device through system broadcast or dedicated signaling.

In an embodiment of the present disclosure, the configuration information may be sent to the terminal by a network side device corresponding to the first cell (for example, a base station corresponding to the first cell) through system broadcast or dedicated signaling.

The dedicated signaling may include msg4 or a handover command or the like.

The configuration information may be configured to the first cell by a network side device other than the base station, and broadcast by the base station corresponding to the first cell, or sent to a terminal accessing the first cell through dedicated signaling.

After receiving the configuration information sent by the network side device (such as the LoggedMeasurementConfiguration, msg4, or handover command, etc.), the terminal may extract the first indication information from the configuration information, and store the first indication information locally, so that the first indication information may be used when the measurement information of the cell needs to be processed.

In step 402, when the terminal enters the first cell, the terminal processes the measurement information according to the first indication information.

In an embodiment of the present disclosure, when entering the first cell, the terminal may process the measurement information according to the processing manner indicated by the first indication information.

The processing manner of processing the measurement information includes at least one of: whether to log the measurement information, and whether to report a logged measurement report.

In an embodiment of the present disclosure, when the terminal enters the first cell and needs to process the measurement information, a corresponding processing manner may be determined through the first indication information, and the measurement information of the first cell may be processed according to the determined processing manner.

For example, when the terminal accesses the first cell, the terminal may determine the manner of processing the measurement information according to the first indication information, so as to subsequently perform processing of logging or not logging the measurement information, and perform processing of reporting or not reporting a logged measurement report.

For example, when the first indication information includes the first tag and the first tag indicates that the measurement information is logged and reported for the SNPN and/or CAG cell, the terminal may log the measurement information when entering the first cell, and after the terminal subsequently enters the RRC connected state, the terminal reports the logged measurement report.

Alternatively, when the first indication information includes the first tag and the first tag indicates that the measurement information is not logged and reported for the SNPN and/or CAG cell, the terminal may not log the measurement information when entering the first cell, and after the terminal subsequently enters the RRC connected state, the step of reporting the logged measurement report is not performed.

In an embodiment of the present disclosure, after entering the first cell, the terminal may check whether the first cell is an SNPN/CSG cell in addition to the PLMN check, and then perform a corresponding operation, such as whether to log measurement information, and/or, whether to send a logged measurement report to the network.

For example, after the terminal accesses the first cell, it can perform the PLMN check operation. If the current RPLMN is a PLMN in a PLMN identity list configured by LoggedMeasurementConfiguration, the terminal further checks whether the first cell is an SNPN/CSG cell. After determining that the first cell is an SNPN/CSG cell, the terminal determines through the first tag whether to log measurement information when entering the first cell, and determines whether to report a logged measurement report, and performs corresponding processing based on the determined information.

For another example, when the first indication information contains the first cell list, the terminal checks whether the first cell list contains the identity of the first cell. If the first cell list contains the identity of the first cell, when the terminal enters the first cell, the terminal logs the measurement information, and after the terminal subsequently enters the RRC connected state, the terminal reports the logged measurement report.

For example, in the logged measurement configuration, the network side device informs the terminal for which IDs of SNPN/CSG cells the terminal may log measurement information and report the logged measurement report.

After the terminal subsequently accesses a cell, the terminal checks (the check may be performed by ID) whether the cell is a member of SNPN/CAG cell(s) configured by the network in addition to the PLMN check. When a condition is met (for example, when the cell is a member of the SNPN/CAG cell(s) configured by the network), the terminal then performs a corresponding operation, for example, the terminal may log measurement information, and/or may send the logged measurement report to the network side device. On the contrary, if the cell is not a member of the SNPN/CAG cell(s) configured by the network, the terminal may not log the measurement information, or the terminal may log the measurement information but not report it.

For another example, when the first indication information includes the second cell list and the third cell list, the terminal checks whether the second cell list includes the identity of the first cell. If the second cell list includes the identity of the first cell, when the terminal enters the first cell, the terminal logs the measurement information; if the second cell list does not include the identity of the first cell, the terminal does not log the measurement information (for example, the measurement is not performed, or the measurement information is discarded). Correspondingly, the terminal may also check whether the third cell list contains the identity of the first cell. If the third cell list includes the identity of the first cell, the terminal reports a logged measurement report; if the third cell list does not include the identity of the first cell, the terminal does not report the logged measurement report.

For example, in the logged measurement configuration, the network side device informs the terminal for which IDs of SNPN/CAG cells the terminal needs to log measurement information, and for which IDs of SNPN/CAG cells the terminal is allowed to report the logged measurement report.

After the terminal subsequently accesses a cell, the terminal checks (the check may be performed by ID) whether the cell is a member of a SNPN/CAG list configured by the network in addition to the PLMN check. When a condition is met, the terminal then performs a corresponding operation. For example, when the cell is a member of a SNPN/CAG list configured by the network for which measurement information needs to be logged, the terminal logs the measurement information; otherwise, the terminal does not log measurement information. Correspondingly, when the cell is a member of a SNPN/CAG list configured by the network for which a logged measurement report is allowed to be reported, the terminal may send the logged measurement report to the network; otherwise, the terminal does not perform reporting.

For another example, if the first indication information includes the second tag, when the terminal enters the first cell, according to the second tag, the terminal directly determines whether to log the measurement information, and/or determines whether to report the logged measurement report, and performs corresponding processing according to the determined information.

For example, the SNPN/CAG cell informs the terminal whether the cell supports measurement information logging and/or reporting of a logged measurement report through system broadcast or dedicated signaling (such as msg4, or a handover command, etc.).

After the terminal subsequently accesses the cell, the terminal checks whether to perform measurement information logging and/or reporting of a logged measurement report for the cell in addition to the PLMN check. When a condition is met, the terminal then performs a corresponding operation. For example, when it is determined by check that measurement information logging needs to be performed for the cell, the terminal logs the measurement information. When it is determined by check that the cell supports reporting of a logged measurement report, the terminal may send a logged measurement report to the network. Optionally, when it is determined by check that measurement information logging is not needed for the cell, the terminal does not log measurement information of the cell; when it is determined by check that the cell does not support reporting of a logged measurement report, the terminal does not send the logged measurement report through the cell to the network.

Through the above solutions of the embodiments of the present disclosure, the terminal can obtain clear guidance to determine whether it is needed to log measurement information and/or report a logged measurement report when accessing a SNPN/CAG cell. In this way, the terminal can reduce air interface operations (no need for the network to send a rejection message to the terminal), save unnecessary power consumption (no need to perform measurement logging), and save storage costs (no need to log unnecessary measurement result).

To sum up, in the solutions shown in the embodiments of the present disclosure, the network side device can configure indication information to the terminal, and when the terminal enters the first cell belonging to the SNPN or CSG cell, the terminal can use the indication information to determine whether to perform processing of logging and/or reporting of measurement information, so as to avoid unnecessary logging and/or reporting of the measurement information of the SNPN or CSG cell, achieve the effect of saving transmission resources, storage resources and terminal power, and improve the resource utilization efficiency when the terminal performs logging and/or reporting of the measurement information.

Figure 5:
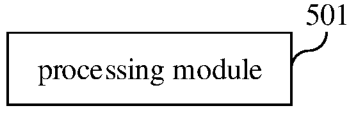
FIG. 5 is a block diagram of a measurement information processing apparatus provided by an embodiment of the present disclosure.

FIG. 5 shows a block diagram of a measurement information processing apparatus provided by an embodiment of the present disclosure. The apparatus is applied in a terminal, and has the function of implementing steps performed by the terminal in the above measurement information processing methods. As shown in FIG. 5, the apparatus may include a processing module 501.

The processing module 501 is configured to, when the terminal enters a first cell, process measurement information according to first indication information;

wherein the first cell is a Stand-alone Non-Public Networks (SNPN) cell or a Closed Access Group (CAG) cell, and a processing manner for processing the measurement information includes at least one of: whether to log the measurement information, and whether to report a logged measurement report.

In a possible implementation, the apparatus further includes:

an indication information receiving module configured to receive the first indication information sent by a network side device.

In a possible implementation, the first indication information includes a first tag, and the first tag is used to indicate at least one of: whether measurement information logging is performed for the SNPN cell and/or CAG cell, and whether reporting of a logged measurement report is performed for the SNPN cell and/or CAG cell.

In a possible implementation, the first indication information includes a first cell list, and the first cell list includes an identity of a cell for which measurement information logging is performed and reporting of a logged measurement report is performed.

In a possible implementation, the first indication information includes a second cell list and a third cell list;

wherein the second cell list includes an identity of a cell for which measurement information logging is performed; and wherein the third cell list includes an identity of a cell for which reporting of a logged measurement report is performed.

In a possible implementation, the indication information receiving module is configured to:

receive the first indication information sent by the network side device when the terminal is in a RRC connected state.

In a possible implementation, the network side device is a base station corresponding to the first cell, and the first indication information includes a second tag; and the second tag is used to indicate at least one of: whether the first cell supports measurement information logging by a connected terminal, and whether the first cell supports reporting of a logged measurement report by the connected terminal in the first cell.

In a possible implementation, the indication information receiving module is configured to:

receive the first indication information sent by the base station through system broadcast or dedicated signaling.

To sum up, in the solutions shown in the embodiments of the present disclosure, when the terminal enters the first cell belonging to the SNPN or CSG cell, the terminal can determine through the indication information whether to perform processing of recording and/or reporting the measurement information, so as to avoid unnecessary recording and/or reporting of the measurement information of the SNPN or CSG cell, achieve the effect of saving transmission resources, storage resources and terminal power, and improve the resource utilization efficiency when the terminal performs recording and/or reporting of the measurement information.

Figure 6:
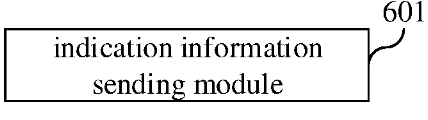
FIG. 6 is a block diagram of a measurement information processing apparatus provided by an embodiment of the present disclosure.

FIG. 6 shows a block diagram of a measurement information processing apparatus provided by an embodiment of the present disclosure. The apparatus is applied in a network side device, and has the function of implementing the steps performed by the network side equipment in the above measurement information processing methods. As shown in FIG. 6, the apparatus may include an indication information sending module 601.

The indication information sending module 601 is configured to send first indication information to a terminal, wherein the first indication information is used to indicate the terminal to process measurement information when entering a first cell, the first cell is a Stand-alone Non-Public Networks (SNPN) cell or a Closed Access Group (CAG) cell, and a processing manner for processing the measurement information includes: whether to log the measurement information, and whether to report a logged measurement report.

In a possible implementation, the first indication information includes a first tag, and the first tag is used to indicate at least one of: whether measurement information logging is performed for the SNPN cell and/or CAG cell, and whether reporting of a logged measurement report is performed for the SNPN cell and/or CAG cell.

In a possible implementation, the first indication information includes a first cell list, and the first cell list includes an identity of a cell for which measurement information logging is performed and reporting of a logged measurement report is performed.

In a possible implementation, the first indication information includes a second cell list and a third cell list;

wherein the second cell list includes an identity of a cell for which measurement information logging is performed; and wherein the third cell list includes an identity of a cell for which reporting of a logged measurement report is performed.

In a possible implementation, the indication information sending module 601 is configured to:

send the first indication information to the terminal when the terminal is in a RRC connected state.

In a possible implementation, the network side device is a base station corresponding to the first cell, and the first indication information includes a second tag; and the second tag is used to indicate at least one of: whether the first cell supports measurement information logging by a connected terminal, and whether the first cell supports reporting of a logged measurement report by the connected terminal in the first cell.

In a possible implementation, the indication information sending module 601 is configured to:

sending the first indication information to the terminal through system broadcast or dedicated signaling.

To sum up, in the solutions shown in the embodiments of the present disclosure, the network side device can configure indication information to the terminal. When the terminal enters the first cell belonging to the SNPN or CSG cell, the terminal can determine through the indication information whether to performing processing of logging and/or reporting the measurement information, so as to avoid unnecessary recording and/or reporting of the measurement information of the SNPN or CSG cell, achieve the effect of saving transmission resources, storage resources and terminal power, and improve the resource utilization efficiency when the terminal performs recording and/or reporting of the measurement information.

It should be noted that when the apparatus provided by the embodiments implements its functions, the division of the above-mentioned functional modules is used as an example. In practical applications, the above-mentioned function allocation can be completed by different functional modules according to actual needs, that is, content structure of the apparatus may be divided into different functional modules to complete all or part of the functions described above.

Regarding the apparatus in the foregoing embodiments, the specific manner in which each module executes operations has been described in detail in the embodiments related to the methods, and will not be described in detail here.

Figure 7:
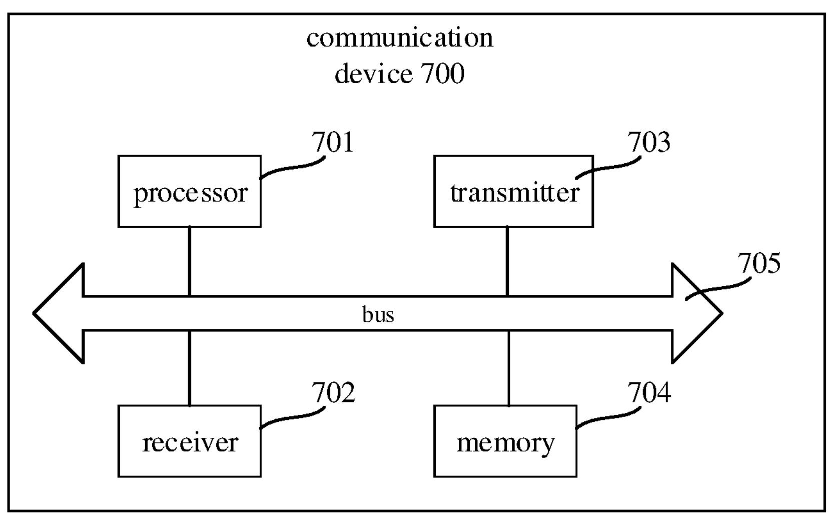
FIG. 7 is a schematic structural diagram of a communication device provided by an embodiment of the present disclosure.

FIG. 7 shows a schematic structural diagram of a communication device 700 provided by an embodiment of the present disclosure. The communication device 700 may include: a processor 701, a receiver 702, a transmitter 703, a memory 704 and a bus 705.

The processor 701 includes one or more processing cores, and the processor 701 executes various functional applications and information processing by running software programs and modules.

The receiver 702 and the transmitter 703 may be implemented as a communication component, and the communication component may be a communication chip. The communication chip may also be called a transceiver.

The memory 704 is connected to the processor 701 through the bus 705.

The memory 704 may be used to store a computer program, and the processor 701 is used to execute the computer program, so as to implement various steps performed by the terminal device in the foregoing method embodiments.

In addition, the memory 704 may be realized by any type of volatile or non-volatile storage device or their combination, and the volatile or non-volatile storage device includes but is not limited to: magnetic disk or optical disk, electrically erasable programmable read only memory, erasable programmable read only memory, static random access memory, read only memory, magnetic memory, flash memory, programmable read only memory.

In an exemplary embodiment, the communication device includes a processor, a memory, and a transceiver (the transceiver may include a receiver and a transmitter, the receiver is used to receive information, and the transmitter is used to send information).

In a possible implementation, when the communication device is implemented as a terminal, the processor is configured to process measurement information according to first indication information when the terminal enters the first cell.

The first cell is a Stand-alone Non-Public Networks (SNPN) cell or a Closed Access Group (CAG) cell, and a processing manner for processing the measurement information includes at least one of: whether to log the measurement information, and whether to report a logged measurement report.

In an embodiment of the present disclosure, for various method steps performed by the communication device which is implemented as a terminal, reference may be made to all or part of the steps performed by the terminal in the embodiments shown in FIG. 2 or FIG. 4 above, and details are not repeated here.

In another possible implementation, when the communication device is implemented as a network side device, the transceiver is configured to send first indication information to a terminal. The first indication information is used to indicate the terminal to process measurement information when entering a first cell. The first cell is a Stand-alone Non-Public Networks (SNPN) cell or a Closed Access Group (CAG) cell, and a processing manner for processing the measurement information includes: whether to log measurement information, and whether to report a logged measurement report.

In an embodiment of the present disclosure, for various method steps performed by the communication device implemented as a network side device, reference may be made to all or part of the steps performed by the communication device in the above embodiment shown in FIG. 3 or FIG. 4, and details are not repeated here.

An embodiment of the present disclosure also provides a computer-readable storage medium, in which a computer program is stored, and the computer program is loaded and executed by a processor to implement various steps performed by the terminal or the network side device in the method shown in FIG. 2, FIG. 3 or FIG. 4 above.

The present disclosure also provides a computer program product including computer instructions stored in a computer-readable storage medium. A processor of a communication device reads the computer instructions from the computer-readable storage medium, and the processor executes the computer instructions, so that the communication device implements various steps performed by the terminal or the network side device in the method shown in FIG. 2, FIG. 3 or FIG. 4 above.

The present disclosure also provides a chip, which is used to run in a communication device, to cause the communication device to implement various steps performed by the terminal or the network side device in the method shown in FIG. 2, FIG. 3 or FIG. 4 above.

The present disclosure also provides a computer program, the computer program is executed by a processor of a communication device, so as to implement various steps performed by the terminal or the network side device in the method shown in FIG. 2, FIG. 3 or FIG. 4 above.

Those skilled in the art should be aware that, in the foregoing one or more examples, the functions described in the embodiments of the present disclosure may be implemented by hardware, software, firmware or any combination thereof. When implemented in software, the functions may be stored on or transmitted over as one or more instructions or code on a computer-readable medium. The computer-readable medium includes a computer storage medium and a communication medium which includes any medium that facilitates transfer of a computer program from one place to another. The storage medium may be any available medium that can be accessed by a general purpose or special purpose computer.

The above are only example embodiments of the present disclosure, and are not intended to limit the present disclosure. Any modifications, equivalent replacements, improvements, etc. made within the spirit and principles of the present disclosure should be included in the protection scope of the present disclosure.

What is claimed is:

1. A measurement information processing method, wherein method is performed by a terminal, and the method comprises:

when the terminal enters a first cell, processing Minimization of Drive-Test (MDT) measurement information according to first indication information;

wherein the first cell is a Stand-alone Non-Public Networks (SNPN) cell or a Closed Access Group (CAG) cell, and a processing manner for processing the MDT measurement information comprises at least one of: whether to log the MDT measurement information, or whether to report a logged MDT measurement report;

wherein the method further comprises:

receiving the first indication information, comprised in a logged measurement configuration, sent by a network side device;

wherein the first indication information comprises a first tag, and the first tag is used to indicate at least one of: whether MDT measurement information logging is performed for at least one of the SNPN cell or CAG cell, or whether reporting of a logged MDT measurement report is performed for at least one of the SNPN cell or CAG cell;

wherein when a value of the first tag is true, it is indicated that the terminal needs to log the MDT measurement information when entering at least one of the SNPN cell or CAG cell, and report a logged MDT measurement report which is obtained by logging to the network side device when the terminal returns to a Radio Resource Control (RRC) connected state;

wherein when a value of the first tag is false, it is indicated that the terminal does not need to log the MDT measurement information when entering at least one of the SNPN cell or CAG cell, and the terminal does not need to report the logged MDT measurement report which is obtained by logging to the network side device when the terminal returns to the RRC connected state.

2. The method according to claim 1, wherein receiving the first indication information sent by the network side device comprises:

receiving the first indication information sent by the network side device when the terminal is in the RRC connected state.

3. The method according to claim 1, wherein the MDT measurement information is measured by the terminal in an RRC idle state.

4. A measurement information processing method, wherein the method is performed by a network side device, and the method comprises:

sending first indication information, comprised in a logged measurement configuration, to a terminal, wherein the first indication information is used to indicate the terminal to process Minimization of Drive-Test (MDT) measurement information when entering a first cell, the first cell is a Stand-alone Non-Public Networks (SNPN) cell or a Closed Access Group (CAG) cell, and a processing manner for processing the MDT measurement information comprises at least one of: whether to log the MDT measurement information, or whether to report a logged MDT measurement report;

wherein the first indication information comprises a first tag, and the first tag is used to indicate at least one of: whether MDT measurement information logging is performed for at least one of the SNPN cell or CAG cell, or whether reporting of a logged MDT measurement report is performed for at least one of the SNPN cell or CAG cell;

wherein when a value of the first tag is true, it is indicated that the terminal needs to log the MDT measurement information when entering at least one of the SNPN cell or CAG cell, and report a logged MDT measurement report which is obtained by logging to the network side device when the terminal returns to a Radio Resource Control (RRC) connected state;

wherein when a value of the first tag is false, it is indicated that the terminal does not need to log the MDT measurement information when entering at least one of the SNPN cell or CAG cell, and the terminal does not need to report the logged MDT measurement report which is obtained by logging to the network side device when the terminal returns to the RRC connected state.

5. The method according to claim 4, wherein sending the first indication information to the terminal comprises:

sending the first indication information to the terminal when the terminal is in the RRC connected state.

6. The method according to claim 4, wherein the MDT measurement information is measured by the terminal in an RRC idle state.

7. A network side device, comprising:

a processor; and a memory storing instructions executable by the processor;

wherein when the instructions are executed by the processor, the network side device is caused to:

send first indication information, comprised in a logged measurement configuration, to a terminal, wherein the first indication information is used to indicate the terminal to process Minimization of Drive-Test (MDT) measurement information when entering a first cell, the first cell is a Stand-alone Non-Public Networks (SNPN) cell or a Closed Access Group (CAG) cell, and a processing manner for processing the MDT measurement information comprises at least one of: whether to log the MDT measurement information, or whether to report a logged MDT measurement report;

wherein the first indication information comprises a first tag, and the first tag is used to indicate at least one of: whether MDT measurement information logging is performed for at least one of the SNPN cell or CAG cell, or whether reporting of a logged MDT measurement report is performed for at least one of the SNPN cell or CAG cell;

wherein when a value of the first tag is true, it is indicated that the terminal needs to log the MDT measurement information when entering at least one of the SNPN cell or CAG cell, and report a logged MDT measurement report which is obtained by logging to the network side device when the terminal returns to a Radio Resource Control (RRC) connected state;

wherein when a value of the first tag is false, it is indicated that the terminal does not need to log the MDT measurement information when entering at least one of the SNPN cell or CAG cell, and the terminal does not need to report the logged MDT measurement report which is obtained by logging to the network side device when the terminal returns to the RRC connected state.

8. The network side device according to claim 7, wherein when the instructions are executed by the processor, the network side device is caused to:

send the first indication information to the terminal when the terminal is in the RRC connected state.

9. The network side device according to claim 7, wherein the MDT measurement information is measured by the terminal in an RRC idle state.

* * * * *